(12) United States Patent
Kakavand

(10) Patent No.: US 10,736,716 B2
(45) Date of Patent: Aug. 11, 2020

(54) SHAPE ENGINEERED ALIGNER—AUTO SHAPING

(71) Applicant: Align Technology, Inc., San Jose, CA (US)

(72) Inventor: Ali Kakavand, San Carlos, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/660,892

(22) Filed: Jul. 26, 2017

(65) Prior Publication Data

US 2017/0319294 A1 Nov. 9, 2017

Related U.S. Application Data

(63) Continuation of application No. 12/203,088, filed on Sep. 2, 2008.

(51) Int. Cl.
*A61C 7/08* (2006.01)
*A61C 7/00* (2006.01)

(52) U.S. Cl.
CPC .............. *A61C 7/08* (2013.01); *A61C 7/002* (2013.01)

(58) Field of Classification Search
CPC .................................. A61C 7/08; A61C 7/002
See application file for complete search history.

(56) References Cited

U.S. PATENT DOCUMENTS

| | | |
|---|---|---|
| 2,467,432 A | 4/1949 | Kesling |
| 3,407,500 A | 10/1968 | Kesling |
| 3,600,808 A | 8/1971 | James |
| 3,660,900 A | 5/1972 | Lawrence |
| 3,683,502 A | 8/1972 | Melvin |
| 3,738,005 A | 6/1973 | Cohen et al. |
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 4,014,096 A | 3/1977 | Dellinger |
| 4,195,046 A | 3/1980 | Kesling |
| 4,253,828 A | 3/1981 | Coles et al. |

(Continued)

FOREIGN PATENT DOCUMENTS

| | | | |
|---|---|---|---|
| AU | 3031677 A | | 5/1979 |
| AU | 517102 B2 | | 7/1981 |

(Continued)

OTHER PUBLICATIONS

AADR. American Association for Dental Research, Summary of Activities, Mar. 20-23, 1980, Los Angeles, CA, p. 195.

(Continued)

*Primary Examiner* — Cris L. Rodriguez
*Assistant Examiner* — Hao D Mai
(74) *Attorney, Agent, or Firm* — Wilson Sonsini Goodrich & Rosati

(57) ABSTRACT

The present invention relates to orthodontic positioning appliances and related methods. An appliance in accordance with the present invention has teeth receiving cavities shaped to receive and apply a resilient positioning force to the patient's teeth. At least one of the cavities of the appliance includes a portion shaped to compensate for non-elastic deformation due to use of the appliance.

12 Claims, 8 Drawing Sheets

(56) References Cited

U.S. PATENT DOCUMENTS

| | | |
|---|---|---|
| 4,324,546 A | 4/1982 | Heitlinger et al. |
| 4,324,547 A | 4/1982 | Arcan et al. |
| 4,348,178 A | 9/1982 | Kurz |
| 4,478,580 A | 10/1984 | Barrut |
| 4,500,294 A | 2/1985 | Lewis |
| 4,504,225 A | 3/1985 | Yoshii |
| 4,505,673 A | 3/1985 | Yoshii |
| 4,526,540 A | 7/1985 | Dellinger |
| 4,575,330 A | 3/1986 | Hull |
| 4,575,805 A | 3/1986 | Moermann et al. |
| 4,591,341 A | 5/1986 | Andrews |
| 4,609,349 A | 9/1986 | Cain |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling |
| 4,676,747 A | 6/1987 | Kesling |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz |
| 4,798,534 A | 1/1989 | Breads |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,889,238 A | 12/1989 | Batchelor |
| 4,890,608 A | 1/1990 | Steer |
| 4,935,635 A | 6/1990 | O'Harra |
| 4,936,862 A | 6/1990 | Walker et al. |
| 4,937,928 A | 7/1990 | Van Der Zel |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell |
| 5,011,405 A | 4/1991 | Lemchen |
| 5,017,133 A | 5/1991 | Miura |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,184,306 A | 2/1993 | Erdman et al. |
| 5,186,623 A | 2/1993 | Breads et al. |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson |
| 5,342,202 A | 8/1994 | Deshayes |
| 5,368,478 A | 11/1994 | Andreiko et al. |
| 5,382,164 A | 1/1995 | Stern |
| 5,395,238 A | 3/1995 | Andreiko et al. |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. |
| 5,621,648 A | 4/1997 | Crump |
| 5,645,420 A | 7/1997 | Bergersen |
| 5,645,421 A | 7/1997 | Slootsky |
| 5,655,653 A | 8/1997 | Chester |
| 5,683,243 A | 11/1997 | Andreiko et al. |
| 5,692,894 A | 12/1997 | Schwartz et al. |
| 5,725,376 A | 3/1998 | Poirier |
| 5,725,378 A | 3/1998 | Wang |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson |
| 5,823,778 A | 10/1998 | Schmitt et al. |
| 5,848,115 A | 12/1998 | Little et al. |
| 5,857,853 A | 1/1999 | Van et al. |
| 5,866,058 A | 2/1999 | Batchelder et al. |
| 5,879,158 A | 3/1999 | Doyle et al. |
| 5,880,961 A | 3/1999 | Crump |
| 5,880,962 A | 3/1999 | Andersson et al. |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 6,015,289 A | 1/2000 | Andreiko et al. |
| 6,044,309 A | 3/2000 | Honda |
| 6,049,743 A | 4/2000 | Baba |
| 6,062,861 A | 5/2000 | Andersson |
| 6,068,482 A | 5/2000 | Snow |
| 6,099,314 A | 8/2000 | Kopelman et al. |
| 6,123,544 A | 9/2000 | Cleary |
| 6,152,731 A | 11/2000 | Jordan et al. |
| 6,183,248 B1 | 2/2001 | Chishti et al. |
| 6,190,165 B1 | 2/2001 | Andreiko et al. |
| 6,217,325 B1 | 4/2001 | Chishti et al. |
| 6,217,334 B1 | 4/2001 | Hultgren |
| 6,244,861 B1 | 6/2001 | Andreiko et al. |
| 6,299,440 B1 | 10/2001 | Phan et al. |
| 6,309,215 B1 | 10/2001 | Phan et al. |
| 6,315,553 B1 | 11/2001 | Sachdeva et al. |
| 6,322,359 B1 | 11/2001 | Jordan et al. |
| 6,350,120 B1 | 2/2002 | Sachdeva et al. |
| 6,382,975 B1 | 5/2002 | Poirier |
| 6,398,548 B1 | 6/2002 | Muhammad et al. |
| 6,402,707 B1 | 6/2002 | Ernst |
| 6,482,298 B1 | 11/2002 | Bhatnagar |
| 6,524,101 B1 | 2/2003 | Phan et al. |
| 6,554,611 B2 | 4/2003 | Chishti et al. |
| 6,572,372 B1 | 6/2003 | Phan et al. |
| 6,629,840 B2 | 10/2003 | Chishti et al. |
| 6,705,863 B2 | 3/2004 | Phan et al. |
| 6,722,880 B2 | 4/2004 | Chishti et al. |
| 7,374,421 B2 | 5/2008 | Solomon |
| 7,831,322 B2 | 11/2010 | Liu et al. |
| 8,651,857 B2 * | 2/2014 | Geenty .............. A61C 7/08 433/6 |
| 2002/0006597 A1 | 1/2002 | Andreiko et al. |
| 2003/0009252 A1 | 1/2003 | Pavlovskaia et al. |
| 2003/0139834 A1 | 7/2003 | Nikolskiy et al. |
| 2003/0224311 A1 | 12/2003 | Cronauer |
| 2004/0128010 A1 | 7/2004 | Pavlovskaia et al. |
| 2005/0055118 A1 | 3/2005 | Nikolskiy et al. |
| 2006/0199140 A1 | 9/2006 | Wen |
| 2006/0234179 A1 | 10/2006 | Wen et al. |
| 2009/0246724 A1 | 10/2009 | Chen et al. |

(56) References Cited

U.S. PATENT DOCUMENTS

| | | | |
|---|---|---|---|
| 2010/0055635 | A1 | 3/2010 | Kakavand |
| 2013/0230819 | A1* | 9/2013 | Arruda .................... A61C 7/22 433/6 |

FOREIGN PATENT DOCUMENTS

| | | |
|---|---|---|
| AU | 5598894 A | 6/1994 |
| CA | 1121955 A | 4/1982 |
| DE | 2749802 A1 | 5/1978 |
| DE | 69327661 T2 | 7/2000 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0667753 B1 | 1/2000 |
| EP | 0774933 B1 | 12/2000 |
| EP | 0731673 B1 | 5/2001 |
| ES | 463897 A1 | 1/1980 |
| FR | 2369828 A1 | 6/1978 |
| FR | 2652256 A1 | 3/1991 |
| GB | 1550777 A | 8/1979 |
| JP | S5358191 A | 5/1978 |
| JP | H0428359 A | 1/1992 |
| JP | H08508174 A | 9/1996 |
| WO | WO-9008512 A1 | 8/1990 |
| WO | WO-9104713 A1 | 4/1991 |
| WO | WO-9410935 A1 | 5/1994 |
| WO | WO-9832394 A1 | 7/1998 |
| WO | WO-9844865 A1 | 10/1998 |
| WO | WO-9858596 A1 | 12/1998 |

OTHER PUBLICATIONS

Alcaniz, et aL, "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.
Alexander et al., "The DigiGraph Work Station Part 2 Clinical Management," JCO, pp. 402-407 (Jul. 1990).
Altschuler, "3D Mapping of Maxillo-Facial Prosthesis," AADR Abstract #607, 2 pages total, (1980).
Altschuler et al., "Analysis of 3-D Data for Comparative 3-D Serial Growth Pattern Studies of Oral-Facial Structures," AADR Abstracts, Program and Abstracts of Papers, 57th General Session, IADR HP Annual Session, Mar. 29, 1979-Apr. 1, 1979, New Orleans Marriot, Journal of Dental Research, vol. 58, Jan. 1979, Special Issue A, p. 221.
Altschuler et al., "Laser Electro-Optic System for Rapid Three-Dimensional (3D) Topographic Mapping of Surfaces," Optical Engineering, 20(6):953-961 (1981).
Altschuler et al., "Measuring Surfaces Space-Coded by a Laser-Projected Dot Matrix," SPIE Imaging Applications for Automated Industrial Inspection and Assembly, vol. 182, p. 187-191 (1979).
Andersson et al., "Clinical Results with Titanium Crowns Fabricated with Machine Duplication and Spark Erosion," Acta. Odontol. Scand., 47:279-286 (1989).
Bartels, et al., An Introduction to Splines for Use in Computer Graphics and Geometric Modeling, Morgan Kaufmann Publishers, pp. 422-425 (1987).
Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.
Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.

Baumrind et al., "Mapping the Skull in 3-D," reprinted from J. Calif. Dent. Assoc., 48(2), 11 pages total, (1972 Fall Issue).
Baumrind, "Integrated Three-Dimensional Craniofacial Mapping: Background, Principles, and Perspectives," Semin. in Orthod., 7(4):223-232 (Dec. 2001).
Begole et al., "A Computer System for the Analysis of Dental Casts," The Angle Orthod., 51(3):253-259 (Jul. 1981).
Bernard et al.," Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.
Bhatia et al., "A Computer-Aided Design for Orthognathic Surgery," Br. J. Oral Maxillofac. Surg., 22:237-253 (1984).
Biggerstaff, "Computerized Diagnostic Setups and Simulations," Angle Orthod., 40(1):28-36 (Jan. 1970).
Biggerstaff et al., "Computerized Analysis of Occlusion in the Postcanine Dentition," Am. J. Orthod., 61(3): 245-254 (Mar. 1972).
Blu, et al., "Linear interpolation revitalized", IEEE Trans. Image Proc., 13(5):710-719 (May 2004.
Bourke, "Coordinate System Transformation," (Jun. 1996), p. 1, retrieved from the Internet Nov. 5, 2004, URL< http://astronomy.swin.edu.au/—pbourke/prolection/coords>.
Boyd et al., "Three Dimensional Diagnosis and Orthodontic Treatment of Complex Malocclusions With the lnvisalipn Appliance," Semin. Orthod., 7(4):274-293 (Dec. 2001).
Brandestini et al., "Computer Machined Ceramic Inlays: in Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form IN Predetermination, Am, Journal of Orthodontics, vol. 79, No. 2 (Feb. 1981), pp. 115-133.
Burstone (interview), "Dr. Charles J. Burstone on The Uses of the Computer in Orthodontic Practice (Part 1)," J. Clin. Orthod., 13(7):442-453 (Jul. 1979).
Burstone (interview), "Dr. Charles J. Burstone on The Uses of the Computer in Orthodontic Practice (Part 2)," J. Clin. Orthod., 13(8):539-551 (Aug. 1979).
Cardinal Industrial Finishes, Powder Coatings information posted at<http://www.cardinalpaint.com> on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside," Part 2 F. Duret—A Man with a Vision, Part 3 The Computer Gives New Vision—Literally, "Part 4 Bytes 'N Bites—The Computer Moves from the Front Desk to the Operatory," Canadian Dental Journal, vol. 54 (9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin. Orthod., 7(4):258-265 (Dec. 2001).

(56) References Cited

OTHER PUBLICATIONS

Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production AG, pp. 1-7 (Jan. 1992.
Definition for gingiva. Dictionary.com p. 1-3. Retrieved from the internet Nov. 5, 2004<http://reference.com/search/search?q=gingiva>.
DeFranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dent-X posted on Sep. 24, 1998 at< http://www.dent-x.com/DentSim.htm>, 6 pages.
Doyle, "Digital Dentistry," Computer Graphics World, pp. 50-52, 54 (Oct. 2000).
Duret et al., "CAD/CAM Imaging in Dentistry," Curr. Opin. Dent., 1:150-154 (1991).
Duret et al, "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et a/., "Automated Finite Element Modeling of a Human Mandible with Dental Implants," JS WSCG '98—Conference Program, retrieved from the Internet:<http://wscg.zcu.cz/wscg98/papers98/Strasser 98.pdf>, 8 pages.
Gao et al., "3-D element Generation for Multi-Connected Complex Dental and Mandibular Structure," Proc. Intl Workshop on Medical Imaging and Augmented Reality, pp. 267-271 (Jun. 12, 2001).
GIM-ALLDENT Deutschland, "Das DUX System: Die Technik," 2 pages total (2002).
Gottleib et al., "JCO Interviews Dr. James A. McNamara, Jr., on the Frankel Appliance: Part 2: Clinical 1-1 Management, "J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxiiofacial Surgery," AAOMS, 3 pages total, (Sep. 13, 1990).
Guess et al., "Computer Treatment Estimates in Orthodontics and Orthognathic Surgery," JCO, pp. 262-28 (Apr. 1989).
Heaven et a/., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressputonfa . . . >.
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).

Hoffmann, et al., "Role of Cephalometry for Planning of Jaw Orthopedics and Jaw Surgery Procedures," (Article Summary in English, article in German), Informatbnen, pp. 375-396 (Mar. 1991).
Hojjatie et al., "Three-Dimensional Finite Element Analysis of Glass-Ceramic Dental Crowns," J. Biomech., 23(11):1157-1166 (1990).
Huckins, "CAD-CAM Generated Mandibular Model Prototype from MRI Data," AAOMS, p. 96 (1999).
JCO Interviews, Craig Andreiko , DDS, MS on the Elan and Orthos Systems, JCO, pp. 459-468 (Aug. 1994).
JCO Interviews, Dr. Homer W. Phillips on Computers in Orthodontic Practice, Part 2, JCO. 1997; 1983:819-831.
Jerrold, "The Problem, Electronic Data Transmission and the Law," AJO-DO, pp. 478-479 (Apr. 1988).
Jones et al., "An Assessment of the Fit of a Parabolic Curve to Pre- and Post-Treatment Dental Arches," Br. J. Orthod., 16:85-93 (1989).
JP Faber et al., "Computerized Interactive Orthodontic Treatment Planning," Am. J. Orthod., 73(1):36-46 (Jan. 1978).
Kamada et.al., Case Reports on Tooth Positioners Using LTV Vinyl Silicone Rubber, J. Nihon University School of Dentistry (1984) 26(1): 11-29.
Kamada et.al., Construction of Tooth Positioners with LTV Vinyl Silicone Rubber and Some Case KJ Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).
Kesling, Coordinating the Predetermined Pattern and Tooth Positioner with Conventional Treatment, KN Am. J. Orthod. Oral Surg. (1946) 32:285-293.
Kesling et al., The Philosophy of the Tooth Positioning Appliance, American Journal of Orthodontics and Oral surgery. 1945; 31:297-304.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984).
KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991.
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
McCann, "Inside the ADA," J. Amer. Dent. Assoc., 118:286-294 (Mar. 1989).
McNamara et al., "Invisible Retainers," J. Cfin. Orthod., pp. 570-578 (Aug. 1985).
McNamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy as One, Two, Three," AOA/Pro Corner, vol. 11, No. 1, 2 pages (2002).
Mormann et al., "Marginale Adaptation von adhasuven Porzellaninlays in vitro," Separatdruck aus: Schweiz. Mschr. Zahnmed. 95: 1118-1129, 1985.
Nahoum, "The Vacuum Formed Dental Contour Appliance," N. Y. State Dent. J., 30(9):385-390 (Nov. 1964).
NASH, "CEREC CAD/CAM Inlays: Aesthetics and Durability in a Single Appointment," Dent. Today, 9(8):20, 22-23 (Oct. 1990).

(56) References Cited

OTHER PUBLICATIONS

Nishiyama et al., "A New Construction of Tooth Repositioner by LTV Vinyl Silicone Rubber," J. Nihon Univ. Sch. Dent., 19(2):93-102 (1977).
Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
Procera Research Projects, "Procera Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993.
Raintree Essix & ARS Materials, Inc., Raintree Essix, Technical Magazine Table of contents and Essix Appliances,< http:// www.essix.com/magazine/defaulthtml> Aug. 13, 1997.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording the Dental Cast in Three Dimensions," Am. J. Orthod. Dentofacial Orthop., 92(3):199-206 (Sep. 1987).
Rudge, "Dental Arch Analysis: Arch Form, a Review of the Literature," Eur. J. Orthod., 3(4):279-284 1981.
Sakuda et al., "Integrated Information-Processing System in Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolamp!. Head Neck Sur9., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Sinclair, "The Readers' Corner," J. Clin. Orthod., 26(6):369-372 (Jun. 1992).
Sirona Dental Systems GmbH, CEREC 3D, Manuel utiiisateur, Version 2.0X (in French), 2003,114 pages total.

Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No-Braces Treatment, Allesee HI Orthodontic Appliances-Pro Lab product information for doctors. http://ormco.com/aoa/appliancesservices/RWB/doctorhtml>, 5 pages (May 19, 2003).
The Choice is Clear: Red, White & Blue . . . The Simple, Affordable, No-Braces Treatment, Allesee HJ Orthodontic Appliances-Pro Lab product information for patients,<http://ormco.com/aoa/appliancesservices/RWB/patients.html>, 2 pages (May 19, 2003).
The Choice Is Clear: Red, White & Blue . . . The Simple, Affordable, No-Braces Treatment, Allesee Orthodontic Appliances-Pro Lab product information, 6 pages (2003).
Truax L., "Truax Clasp-Less(TM) Appliance System," Funct. Orthod., 9(5):22-4, 26-8 (Sep.-Oct. 1992).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20,1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11):769-778 (1993).
Varady et al., "Reverse Engineering of Geometric Models—An Introduction," Computer-Aided Design, 29(4):255-268,1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 399-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL<http://wscg.zcu.cz/wscg98/wscg98.h>.
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).

(56) References Cited

OTHER PUBLICATIONS

Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).

Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).

Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).

Andrews, The Six Keys to Optimal Occlusion Straight Wire, Chapter 3, pp. 13-24 (1989).

Biostar Opeation & Training Manual. Great Lakes Orthodontics, Ltd. 199 Fire Tower Drive, Tonawanda, New York. 14150-5890, 20 pages total (1990).

Dentrac Corporation, Dentrac document, pp. 4-13 (1992).

DuraClearTM product information, Allesee Orthodontic Appliances—Pro Lab, 1 page (1997).

Important Tip About Wearing the Red White & Blue Active Clear Retainer System, Allesee Orthodontic Appliances—Pro Lab, 1 page 1998).

Rekow et al., "CAD/CAM for Dental Restorations—Some of the Curious Challenges," IEEE Trans. Biomed. Eng., 38(4):314-318 (Apr. 1991).

Siemens, "CEREC—Computer-Reconstruction," High Tech in der Zahnmedizin, 14 pages total (2004).

The Red, White & Blue Way to Improve Your Smile! Allesee Orthodontic Appliances—Pro Lab product information for patients, 2 pages 1992.

Tru-Tain Orthodontic & Dental Supplies, Product Brochure, Rochester, Minnesota 55902, 16 pages total (1996).

Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.

You May Be a Candidate for This Invisible No-Braces Treatment, Allesee Orthodontic Appliances—Pro Lab product information for patients, 2 pages (2002).

\* cited by examiner

SHAPE ENGINEERED ALIGNER—AUTO SHAPING

CROSS-REFERENCE

This application is a continuation application of U.S. application Ser. No. 12/203,088, filed Sep. 2, 2008, the entirety of which is incorporated herein by reference.

BACKGROUND OF THE INVENTION

The present invention relates generally to the field of orthodontics. More particularly, the present invention relates to orthodontic positioning appliances shaped to compensate for non-elastic deformation and related methods.

An objective of orthodontics is to move a patient's teeth to positions where function and/or aesthetics are optimized. Traditionally, appliances such as braces are applied to the patient's teeth by an orthodontist or dentist and the set of braces exerts continual force on the teeth and gradually urges them toward their intended positions. Over time and with a series of clinical visits, the orthodontist adjusts the appliances to move the teeth toward their final destination.

More recently, alternatives to conventional orthodontic treatment with traditional affixed appliances (e.g., braces) have become available. For example, systems including a series of preformed shell appliances have become commercially available from Align Technology, Inc., Santa Clara, Calif., under the trade name Invisalign® System. An Invisalign® System shell appliance can be made from thin clear plastic and have teeth receiving cavities. In use, the shell appliance is placed over the patient's teeth and is removable. Shell appliances are designed to impart positioning or repositioning forces to the patient's teeth. The imparted forces are resilient in nature and are associated with corresponding appliance elastic deformation. When used to reposition teeth, a series of individual appliances are worn by a patient to elastically reposition the patient's teeth over time. When used to position teeth, one or more identical shell appliances are worn to restrain a patient's teeth in their current arrangement.

While alternative orthodontic treatment systems using patient removable positioning appliances represent a considerable advancement in the field of orthodontics, appliance design improvements remain of interest. For example, in some cases undesirable non-elastic deformation may occur due to use of a shell appliance. Therefore, appliance design systems, as well as related systems, that address and/or compensate for such undesirable deformation would be beneficial.

BRIEF SUMMARY OF THE INVENTION

The present invention provides improved orthodontic positioning appliances and related methods. These improved appliances are shaped to compensate for non-elastic deformation that may occur as a result of appliance use. Significant appliance non-elastic deformation may degrade the performance of the appliance by reducing or eliminating desirable contact forces between the appliance and a patient's teeth. By shaping the appliance to compensate for expected or observed non-elastic deformation, the amount of appliance performance degradation due to non-elastic deformation is decreased. Appliances with decreased performance degradation may help to decrease treatment time and expense.

Thus, in one aspect, the present invention provides an orthodontic appliance having teeth receiving cavities. At least one of the cavities can include a portion shaped to compensate for non-elastic deformation that may be due to a variety of reasons, such as appliance use.

The present invention further provides methods for fabricating an orthodontic appliance having teeth receiving cavities. Such a method can include receiving a representation of a patient's teeth in a selected arrangement. An appliance can be fabricated based on the received representation and can include one or more teeth receiving cavities having a cavity portion shaped to compensate for non-elastic deformation due to use of the appliance. Such methods can include various computer based techniques and methodologies.

For a fuller understanding of the nature and advantages of the present invention, reference should be made to the ensuing detailed description and accompanying drawings. Other aspects, objects, and advantages of the invention will be apparent from the drawings and detailed description that follows.

DETAILED DESCRIPTION OF THE INVENTION

The invention described herein provides improved orthodontic positioning appliances and related methods. According to the present invention, an orthodontic positioning appliance can be shaped to compensate for appliance non-elastic deformation that can occur over time as a result of use of the appliance. Appliance non-elastic deformation can occur due to a variety of causes. For example, possible causes can include material creep and/or stress relaxation. Another exemplary cause is appliance expansion or contraction caused by hydration or temperature changes. Significant amounts of appliance non-elastic deformation may reduce or eliminate desirable contact forces between the appliance and the teeth, thereby degrading appliance performance. Appliances of the present invention can advantageously maintain higher levels of desirable contact forces in the presence of significant amounts of non-elastic deformation, thereby reducing performance degradation due to non-elastic deformation.

Orthodontic positioning appliances of the present invention can be defined and manufactured in a variety of ways, including using methods describe herein. These appliances can be fabricated using both direct and indirect methods. These appliances can also be modeled/designed using computer implemented methods.

Figure 1:
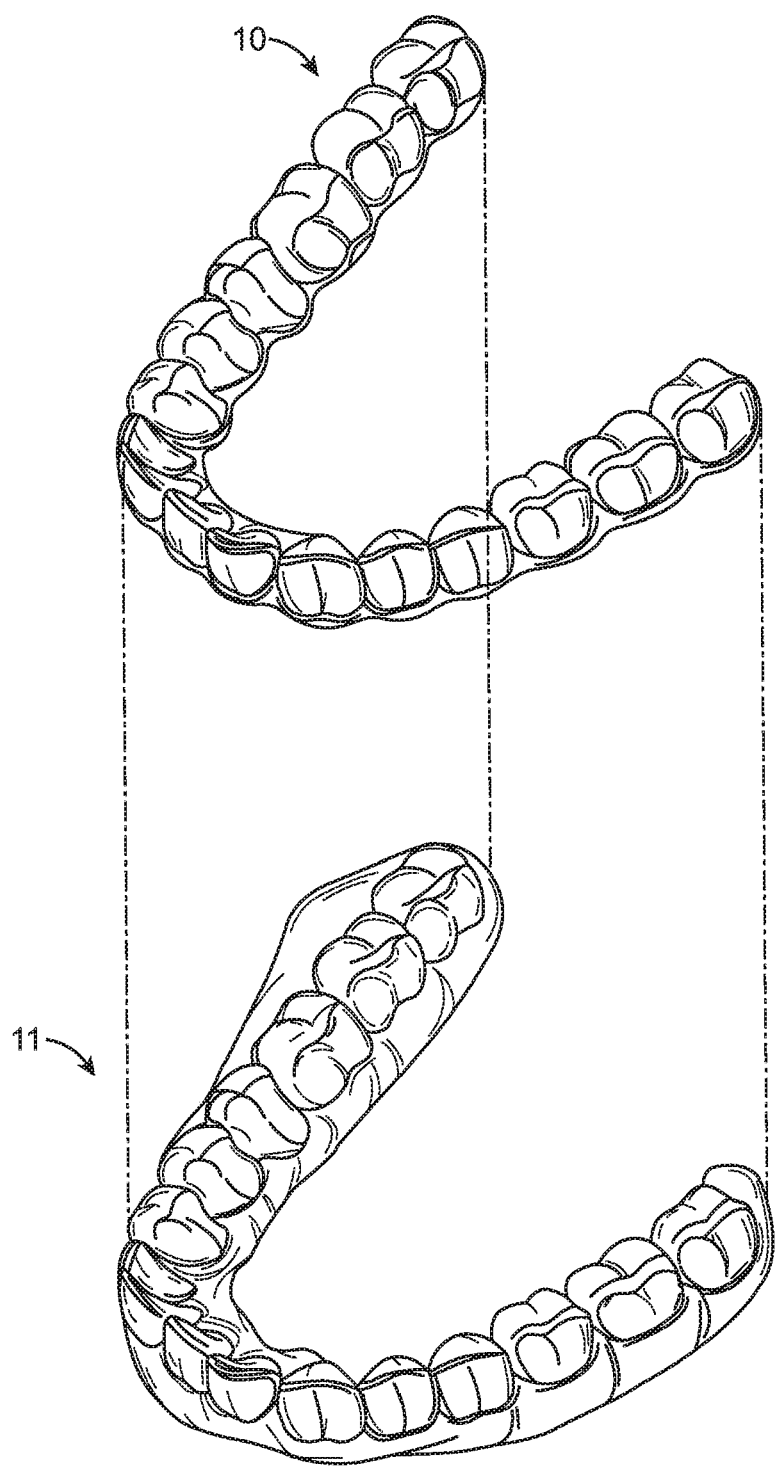
FIG. 1 illustrates a lower jaw and an orthodontic positioning appliance.

FIG. 1 shows one adjustment appliance 10 which is worn by the patient in order to restrain and/or reposition a patient's teeth (e.g., teeth as illustrated in jaw 11). The appliance can include a shell (e.g., polymeric shell) having teeth-receiving cavities that receive and resiliently restrain and/or reposition the teeth. In one embodiment, a polymeric appliance can be formed from a thin sheet of suitable elastomeric polymeric material, such as Tru-Train (e.g., 0.03 inch) thermal forming dental material (Tru-Train Plastics, Rochester, Minn.). An appliance can fit over all teeth present in an upper or lower jaw, or less then all of the teeth. In some cases, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during treatment. Teeth which are moved can also serve as a base or anchor for holding the appliance as it is worn by the patient. Typically, no wires or other means will be provided for holding an appliance in place over the teeth. In some cases, however, it may be desirable or necessary to provide individual anchors on teeth with corresponding receptacles or apertures in the appliance so that the appliance can apply a selected force on the tooth. Exemplary appliances, including those utilized in the Invisalign® System, are described in numerous patents and patent applications assigned to Align Technology, Inc. including, for example in U.S. Pat. Nos. 6,450,807, and 5,975,893, as well as on the company's website, which is accessible on the World Wide Web (see, e.g., the url "align.com").

An appliance can be designed and/or provided as part of a set or plurality of appliances. In such an embodiment, each appliance may be configured so a tooth-receiving cavity has a geometry corresponding to an intermediate or final tooth arrangement intended for the appliance. The patient's teeth are progressively repositioned from their initial tooth arrangement to a final tooth arrangement by placing a series of incremental position adjustment appliances over the patient's teeth. The adjustment appliances can be generated all at the same stage or in sets or batches, e.g., at the beginning of a stage of the treatment, and the patient wears each appliance until the pressure of each appliance on the teeth can no longer be felt or has resulted in the maximum allowable tooth movement for that given stage. A plurality of different appliances (e.g., set) can be designed and even fabricated prior to the patient wearing any appliance of the plurality. After wearing an appliance for an appropriate period of time, the patient replaces the current appliance with the next appliance in the series until no more appliances remain. The appliances are generally not affixed to the teeth and the patient may place and replace the appliances at any time during the procedure (e.g., patient removable appliances). The final appliance or several appliances in the series may have a geometry or geometries selected to overcorrect the tooth arrangement, i.e., have a geometry which would (if fully achieved) move individual teeth beyond the tooth arrangement which has been selected as the "final." Such over-correction may be desirable in order to offset potential relapse after the repositioning method has been terminated, i.e., to permit movement of individual teeth back toward their pre-corrected positions. Over-correction may also be beneficial to speed the rate of correction, i.e., by having an appliance with a geometry that is positioned beyond a desired intermediate or final position, the individual teeth will be shifted toward the position at a greater rate. In such cases, the use of an appliance can be terminated before the teeth reach the positions defined by the appliance.

Figure 2A:
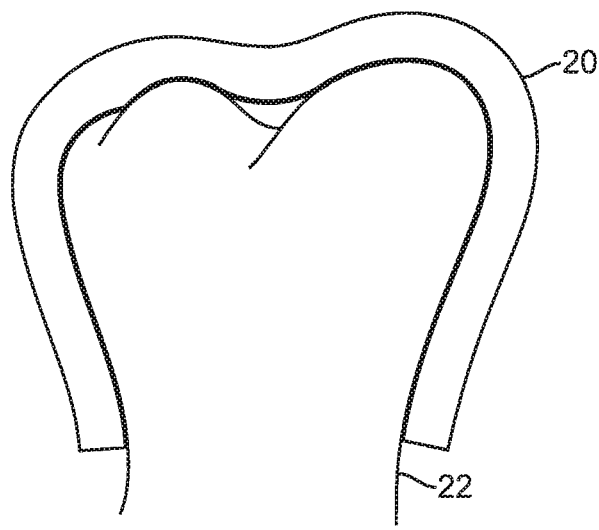
FIG. 2A illustrates a cross section of a tooth together with a cross section of a orthodontic positioning appliance that is not showing signs of significant non-elastic deformation.

Referring now to FIG. 2A, a cross-sectional illustration shows a tooth 22 within its associated cavity of an orthodontic positioning shell appliance 20 that has not been modified to compensate for non-elastic deformation. As shown, the cavity of the appliance 20 generally conforms to the outer surface of the tooth 22. In some cases, general conformance between the appliance 20 cavity and the tooth 22 is most optimal when a new appliance 20 is initially installed, where the appliance 20 shape has not been distorted by any significant non-elastic deformation. This conformance provides generally continual contact between the cavity of the appliance 20 and the tooth 22. Forces can be transmitted from the appliance 20 to the tooth 22 at points of contact, which allows the appliance 20 to impart its positioning or repositioning forces to the tooth 22.

Figure 2B:
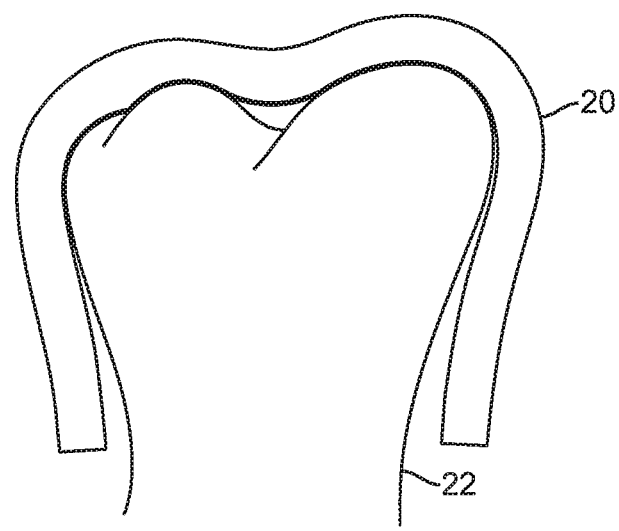
FIG. 2B illustrates a cross section of a tooth together with a cross section of a orthodontic positioning appliance that is showing signs of significant non-elastic deformation.

FIG. 2B illustrates the impact that appliance non-elastic deformation can have on how well the appliance 20 cavity conforms to the exterior surfaces of a tooth 22. In some cases, the use of an appliance 20 can result in non-elastic deformation that tends to change the interior shape of the appliance cavities. Use of an appliance results in internal strains associated with the external deflection of the appliance. These external deflections can occur during use of an appliance. For example, during installation and removal of the appliance the cavity openings can be stretched, such as when passing over relatively wider portions of some teeth, such as molars, or the stretching can occur as a result of the method of insertion or removal. This stretching can be more pronounced in a direction normal to the arch, due to the relative lack of appliance cavity walls in the inter-proximal region between adjacent teeth. Internal strains in an appliance can also arise due to a variety of additional reasons, such as from positioning/repositioning forces imparted on the teeth by the appliance, or from expansion/contraction of the appliance due to appliance hydration or temperature changes. Appliance internal strains can result in non-elastic deformation due to material creep and/or stress relaxation. Where significant amounts of non-elastic deformation have occurred, the appliance 20 cavity may be distorted to a point where conformance with the exterior of the tooth 22 is less than optimal. For example, one type of distortion is illustrated in FIG. 2B, which shows a cavity cross section that has experienced a significant increase in width at the opening of the cavity. As shown, this increased width can lead to loss of contact between the appliance cavity and portions of the tooth, which may lead to a reduction in appliance performance.

Figure 3:
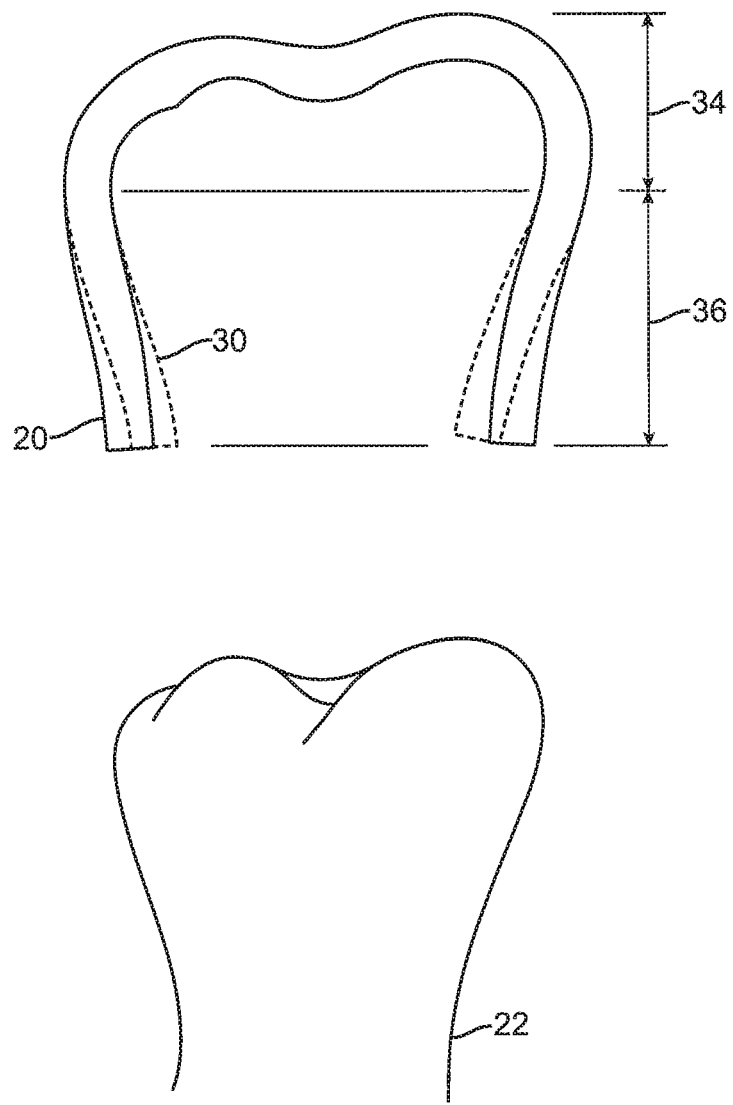
FIG. 3 illustrates a cross section of a tooth and a cross section of an orthodontic positioning appliance showing a modification in accordance with an embodiment of the present invention.

FIG. 3 illustrates a cross section of an orthodontic positioning appliance 30 showing a modification in accordance with an embodiment of the present invention. As shown, the appliance 30 includes an upper portion 34 and a lower portion 36. In the embodiment shown, the lower portion 36 is modified as shown in the dashed lines to compensate for expected amounts of non-elastic deformation due to use of the appliance. Depending upon the particular circumstances, such as the particular tooth geometry, appliance geometry, and appliance material, different amounts of non-elastic deformation may result due to use of the appliance over time. For example, where a tooth is significantly wider away from the gingival margin than it is near the gingival margin, such as for particular molars, higher levels of internal strain may occur during installation and removal leading to higher levels of material creep and/or stress relaxation and resulting non-elastic deformation. Although larger or smaller amounts of maximum deformation are possible, in some cases levels of appliance non-elastic deformation may range between zero and thirty percent of the initial dimension, with some cases ranging between five to twenty percent, and with some cases ranging between ten and fifteen percent. In the embodiment shown, the width of the internal cavity has been decreased to the greatest extent near the cavity opening, where the maximum amount of non-elastic deformation is expected to occur. As shown, the width of the cavity in the lower portion 36 has been decreased by a progressively smaller amount, thereby reaching no change in the width where the lower portion 36 joins the upper portion 34. The progressive modification shown can be beneficial in compensating for the appliance non-elastic deformation depicted in FIG. 2B.

It should be appreciated that a wide range shape modification can be practiced within the scope of the present invention. Particular shape modifications may be beneficial to compensate for particular non-elastic deformations observed or expected, which may arise due to a wide range of reasons, including the complex dental/appliance geometry. Particular shape modifications may also be beneficial to produce desired force/torque levels between the appliance and the patient's teeth. As such, the illustrated embodiment of FIG. 3 is just one of many possible compensating shape modifications that can be practiced in accordance with the present invention. For example, as can be seen by comparing the embodiment of FIG. 3 with FIG. 2B, the modification of FIG. 3 generally represents a complement of the deformation shown in FIG. 2B. Similar complementary shape modification can be practiced for each of the wide range of deformations that may occur as a result of appliance use. In general, shape modifications that can be practice are not limited to shape modifications used to compensate for observed or expected non-elastic deformations, or to shape modifications used to produce desired force/torque levels. For example, shape modifications can also be practiced to compensate for other dimensionally related considerations, such as expansion or contraction due to appliance hydration or temperature changes.

Figure 4A:
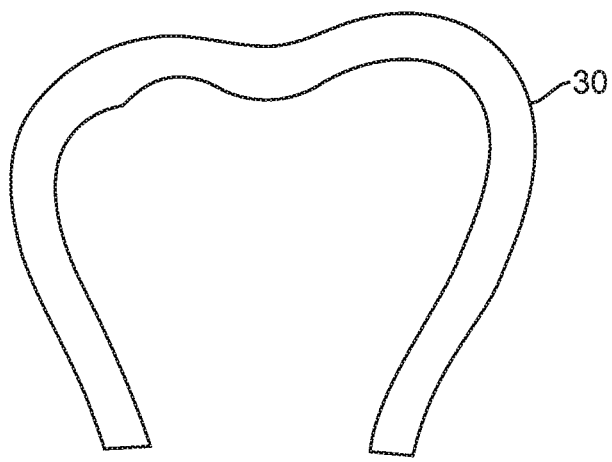
FIG. 4A illustrates a cross section of a tooth and a cross section of an orthodontic positioning appliance in accordance with an embodiment of the present invention.
Figure 4A:
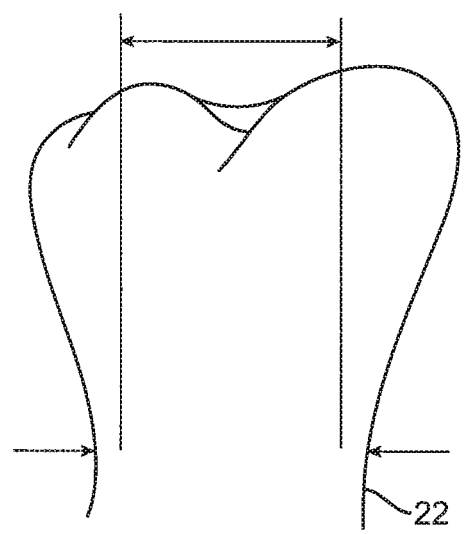
Figure 4B:
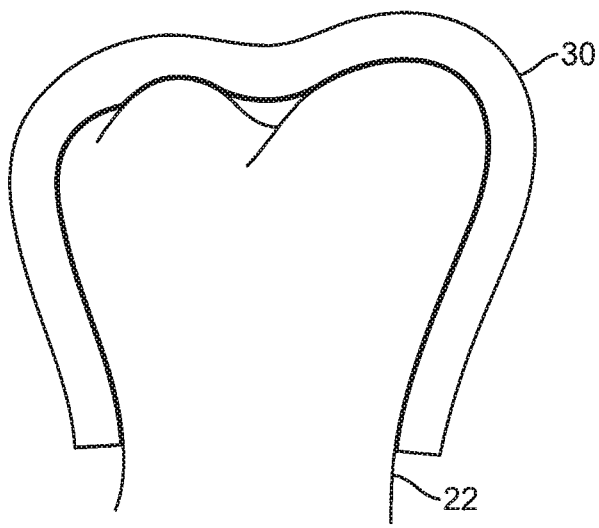
FIG. 4B illustrates the appliance and the tooth of FIG. 4A when the appliance is worn by the patient.

Referring now to FIGS. 4A and 4B, a cross sections of a tooth 22 and an embodiment of an orthodontic positioning appliance 30 in conformance with the present invention are shown. The embodiment shown incorporates the compensating shape modification as shown in FIG. 3. The shape modification results in the cavity opening that is smaller than a corresponding width of the associated tooth. When the appliance worn, the interfacing surfaces of the tooth force the contacting appliance cavity surfaces outward. The resulting contact forces between the tooth and the appliance cavity in FIG. 4B are greater than the resulting contact forces between the tooth and the appliance in FIG. 2A due to the greater imposed deflection on the appliance. As a result, the appliance embodiment of FIGS. 4A and 4B would have to experience greater amounts of non-elastic deformation before the gapping condition shown in FIG. 2B would result. This ability to tolerate increased amount of appliance non-elastic deformation serves to increase the ability of the appliance to impart desired positioning/repositioning forces/torques to the teeth during its course of use by the patient.

Figure 5:
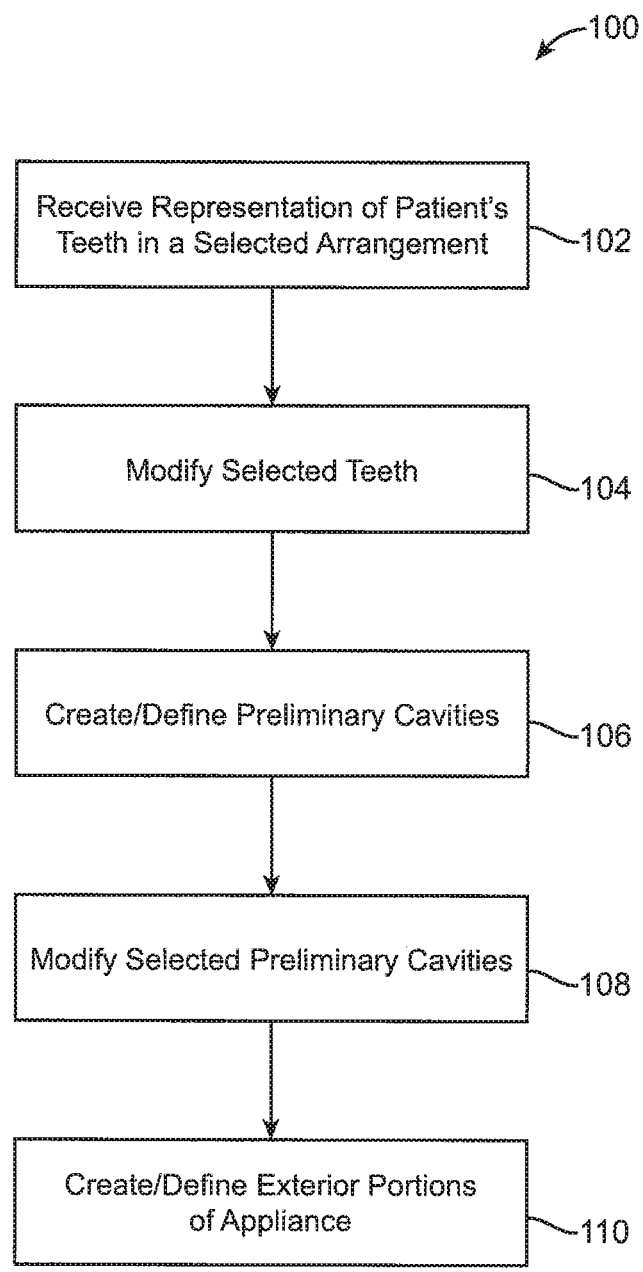
FIG. 5 is a block diagram illustrating the steps of a method for defining an orthodontic positioning appliance in accordance with the present invention.

Referring now to FIG. 5, an exemplary method 100 for defining an orthodontic positioning appliance in accordance with the present invention will now be described. It should be appreciated that the method 100 can be practiced in a variety of ways. For example, the method 100 can be computer implemented and employ three-dimensional modeling representations and techniques. The method 100 can also be practiced using physical models, such as models based upon impressions or scans of the patient's teeth. These models can be physically manipulated to produce a physical representation of the patients teeth in a selected arrangement.

The method 100 starts with receiving a representation of the patient's teeth in a selected arrangement (step 102). The selected arrangement in particular, and the representation in general, will depend upon the purpose of the particular appliance being defined. Where the appliance will be used to apply positioning forces to constrain a patient's teeth in their current arrangement, the selected arrangement can correspond to the current arrangement of the patient's teeth. Where the appliance will be used to apply repositioning forces to move the patient's teeth from their current arrangement toward a subsequent arrangement, the selected arrangement will typically deviate from the current arrangement of the patient's teeth. For example, the selected arrangement can generally correspond to a subsequent arrangement toward which the teeth are to be repositioned. The received representation, as modified by subsequent steps in the exemplary method 100, forms a basis for the definition of the teeth receiving cavities of the appliance as described below.

In step 104, selected teeth of the received representation are optionally modified. This optional modification can include any number of the teeth, from one to all. A wide range of modifications are possible. For example, the size of any number of teeth can be scaled by a desired amount. By decreasing the size of a tooth in the representation, the resulting cavity for the tooth will be smaller than the patient's actual tooth, thereby producing increased interference/contact forces between the cavity and the tooth. Similarly, increasing the size of a tooth in the representation will result in a cavity larger than the patient's actual tooth, thereby producing decreased contact between the cavity and the tooth. Scaling can also be used to compensate for expected levels of expansion/contraction of the aligner during use. For example, an aligner may expand or contract due to changes in its temperature and/or hydration level as a result of being exposed to the oral environment of the patient's mouth.

The teeth in the representation can also be locally modified, by either adding or removing material. Many local modifications are possible and can be used to modify resulting force characteristics of the appliance. In general, local removal of material from the representation will result in greater interference between the resulting cavity of the appliance and the local region of the tooth, thereby producing greater contact forces.

Although not required, modified areas of the teeth can be limited to areas of the teeth that would contact the appliance cavities. Modification of areas of the teeth that do not contact appliance cavities, such as certain inter-proximal regions, would typically not impact the shape of the resulting cavity. For example, where the received representation is digital, it may be possible to individually scale up each of the teeth in the representation. Such a scaling would likely result in one or more virtual interferences between adjacent teeth in the inter-proximal area. These interfering areas can be ignored during the definition of the cavities of the appliance. Where the received representation is a physical model, modification by adding or removing material would typically be limited to portions of the teeth that would contact the cavities of the appliance. For the embodiment of the appliance illustrated in FIGS. 3 and 4A, the areas of modification would generally be limited to buccal/lingual surfaces of the teeth away from the crowns.

In step 106, the modified representation of the patient's teeth is used to define preliminary cavities. Where method 100 is computer implemented, step 106 can be accomplished in a variety of ways, such as by defining cavities using solid subtraction, or by defining cavities based on exterior surface definitions of the teeth in the modified representation. Where the modified representation is a physical model, the modified representation can be used as a positive mold/model over which a sheet of polymeric material can be formed, thereby forming cavities.

In step 108, the preliminary cavities can be optionally modified. Typically, step 108 would be used where no modification of selected teeth in the received representation was accomplished in step 104. However, is should be appreciated that modifications can be made in both step 104 and step 108 and be within the scope of the present invention. As such, exemplary modifications that can be made in step 108 are generally complementary to corresponding modifications that can be made in step 104. For example, where as in step 104 material can be locally removed to increase resulting contact forces, in step 108 material could be added to achieve the same result. Where exemplary method 100 is computer implemented, material can be digitally added or removed from the cavity definition. Where method 100 is physically implemented, material can be physically added or removed from the physical representations of the cavities.

In step 110, exterior portions of the appliance are defined. A variety of methods can be used depending on the general approach used to practice exemplary method 100. Where method 100 is computer implemented, exterior portions of the appliance can be digitally defined using numerous different approaches. In one exemplary approach, a three-dimensional solid model representation of teeth can be scaled up. The scaled representation of teeth can be the patient's teeth in a selected arrangement, or even a modified representation of the patient's teeth in a selected arrangement. Another approach would be to offset exterior surfaces from a three-dimensional representation of teeth, or exterior surfaces from representations of the patient's teeth in a selected arrangement. Yet another approach would be to scale the received representation or the modified representation.

Figure 6:
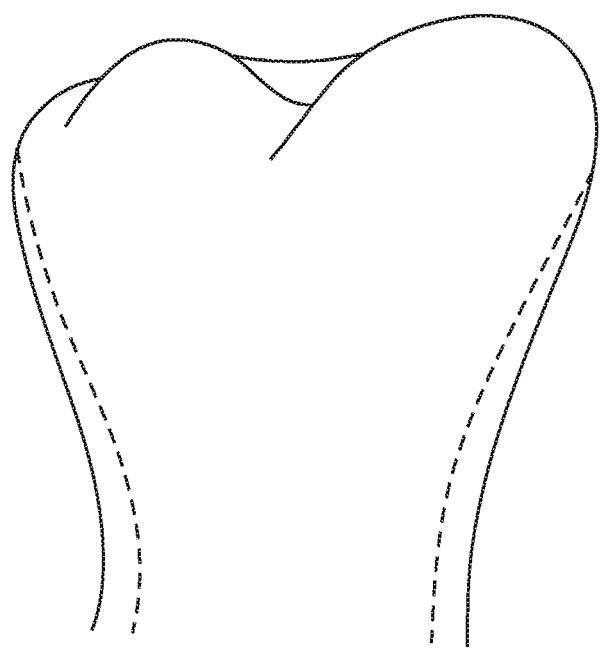
FIG. 6 illustrates a modified tooth external profile that can be used to define the shape of a tooth receiving cavity in accordance with an embodiment of the present invention.

Referring now to FIG. 6, an exemplary local modification that can be practiced in step 104 of FIG. 5 is illustrated. FIG. 6 illustrates a cross section of a molar that has been modified by removing material. The solid lines in FIG. 6 depict the cross section of the molar before modification. The dashed lines show the cross section as modified. As shown, the portion of the molar away from the gingival margin has not been modified. The depth of material removal is greatest near the gingival margin, and becomes progressively less away from the gingival margin. The resulting tooth shape is in general conformance with the modified aligner cavity depicted in FIGS. 3 and 4A.

Figure 7A:
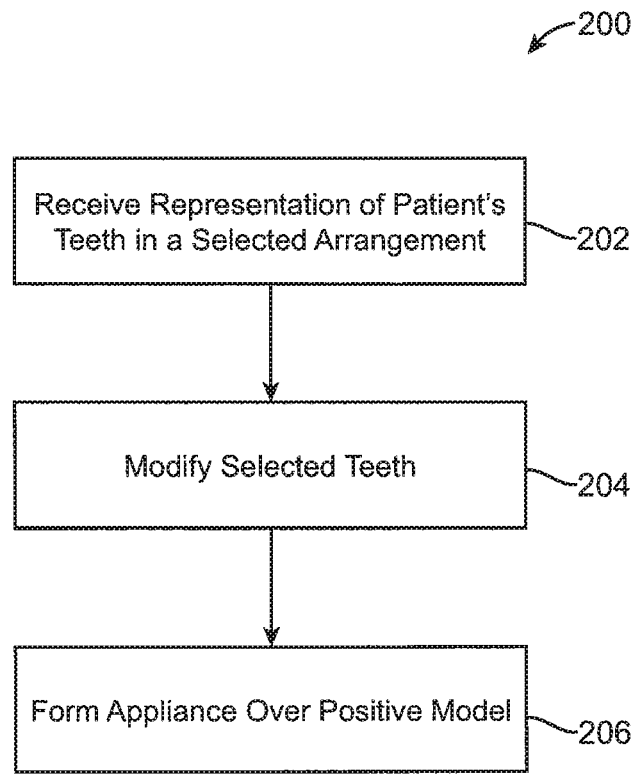
FIG. 7A is a block diagram illustrating the steps of a one method for fabricating an orthodontic positioning appliance in accordance with the present invention.

FIG. 7A illustrates an exemplary method 200 for fabricating an orthodontic positioning appliance in accordance with the present invention. In step 202, a representation of a patient's teeth in a selected arrangement is received. In step 204, selected teeth of the received representation are modified. Step 202 and step 204 are the same as step 102 and step 104 of FIG. 5 respectively, so the foregoing discussion of these steps applies and will not be repeated here. As discussed above with respect to step 102 and step 104, it should be appreciated that step 202 and step 204 can be computer implemented, or practiced using physical representations, or combinations thereof. In step 206, the appliance can be fabricated by forming a sheet of polymeric material over a physical model/mold corresponding to the digital or physical definition resulting from step 202 and 204.

Figure 7B:
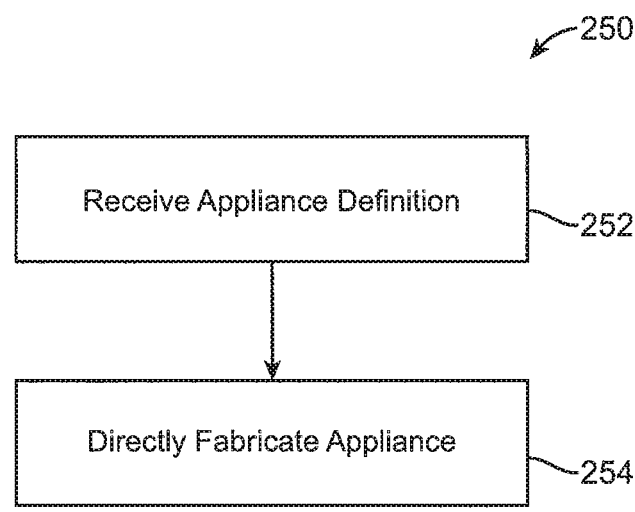
FIG. 7B is a block diagram illustrating the steps of another method for fabricating an orthodontic positioning appliance in accordance with the present invention.

FIG. 7B shows another exemplary method 250 for directly fabricating an orthodontic positioning appliance. Method 250 can involve using a digital definition of the appliance to control a fabrication machine. Various known manufacturing processes can be used to directly fabricate an orthodontic positioning appliance. In one approach, the appliance is formed by a stereo-lithography fabrication machine, where resin is selectively hardened in the shape of the appliance definition.

Figure 8:
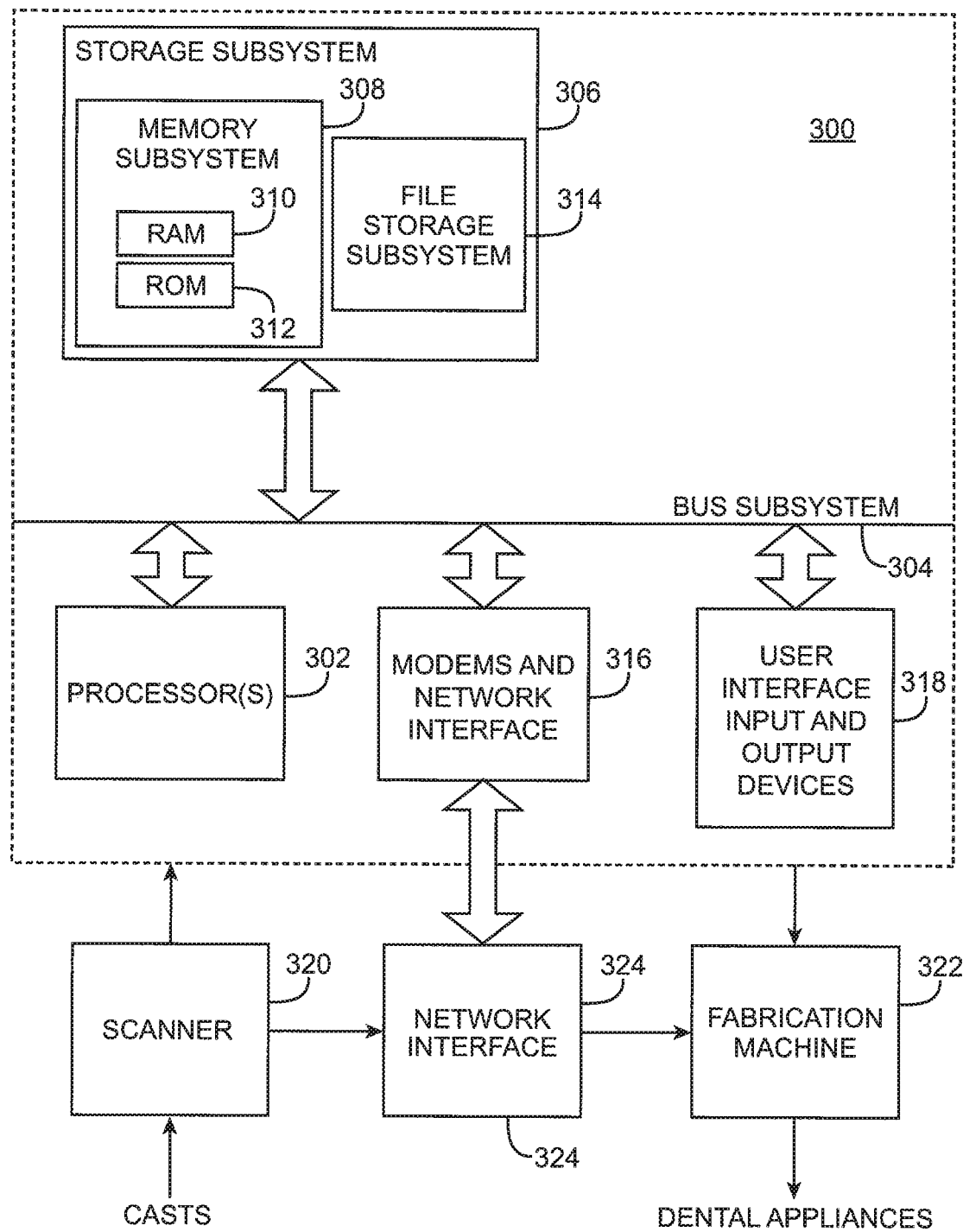
FIG. 8 is a simplified block diagram of a data processing system incorporating an embodiment of the present invention.

FIG. 8 is a simplified block diagram of a data processing system 300 embodying the present invention. Data processing system 300 typically includes at least one processor 302 which communicates with a number of peripheral devices via bus subsystem 304. These peripheral devices typically include a storage subsystem 306 (memory subsystem 308 and file storage subsystem 314), a set of user interface input and output devices 318, and an interface to outside networks 316, including the public switched telephone network. This interface is shown schematically as "Modems and Network Interface" block 316, and is coupled to corresponding interface devices in other data processing systems via communication network interface 324. Data processing system 300 could be a terminal or a low-end personal computer or a high-end personal computer, workstation or mainframe.

The user interface input devices typically include a keyboard and may further include a pointing device and a scanner. The pointing device may be an indirect pointing device such as a mouse, trackball, touchpad, or graphics tablet, or a direct pointing device such as a touch screen incorporated into the display. Other types of user interface input devices, such as voice recognition systems, are also possible.

User interface output devices typically include a printer and a display subsystem, which includes a display controller and a display device coupled to the controller. The display device may be a cathode ray tube (CRT), a flat-panel device such as a liquid crystal display (LCD), or a projection device. The display subsystem may also provide non-visual display such as audio output.

Storage subsystem 306 maintains the basic programming and data constructs that provide the functionality of the present invention. Software modules used to implement the methods discussed above are typically stored in storage subsystem 306. Storage subsystem 306 typically comprises memory subsystem 308 and file storage subsystem 314.

Memory subsystem 308 typically includes a number of memories including a main random access memory (RAM)

310 for storage of instructions and data during program execution and a read only memory (ROM) 312 in which fixed instructions are stored. In the case of Macintosh-compatible personal computers the ROM would include portions of the operating system; in the case of IBM-compatible personal computers, this would include the BIOS (basic input/output system).

File storage subsystem 314 provides persistent (non-volatile) storage for program and data files, and typically includes at least one hard disk drive and at least one disk drive (with associated removable media). There may also be other devices such as a CD-ROM drive and optical drives (all with their associated removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 304 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner 320 is responsible for scanning impressions or casts of the patient's teeth obtained either from the patient or from an orthodontist and providing the scanned digital data set information to data processing system 300 for further processing. In a distributed environment, scanner 320 may be located at a remote location and communicate scanned digital data set information to data processing system 300 via network interface 324.

Fabrication machine 322 fabricates dental appliances based on intermediate and final data set information received from data processing system 300. In a distributed environment, fabrication machine 322 may be located at a remote location and receive data set information from data processing system 300 via network interface 324.

While the above is a complete description of the preferred embodiments of the invention, various alternatives, modifications, and equivalents may be used. Therefore, the above description should not be taken as limiting the scope of the invention which is defined by the appended claims.

What is claimed is:

1. An orthodontic positioning appliance comprising:
   a patient removable orthodontic tooth positioning appliance including:
   a shell of polymeric sheet material having:
   teeth receiving cavities shaped to receive and apply a resilient positioning force to a plurality of the patient's teeth;
   wherein at least one of the teeth receiving cavities includes:
   (i) an upper portion; and
   (ii) a lower portion having a proximal end beginning at the upper portion and a distal end terminating near the patient's gingival margin when the orthodontic positioning appliance is worn by the patient;
   wherein the upper portion is shaped to match a contour of an occlusal surface of a patient's tooth of the plurality of the patient's teeth such that the upper portion is in contact with the occlusal surface of the patient's tooth when the orthodontic positioning appliance is worn by the patient;
   wherein the lower portion of the shell of polymeric sheet material is:
   shaped to compensate for non-elastic deformation due to the patient's tooth being significantly wider away from the patient's gingival margin than near the patient's gingival margin, by being produced to have a width of the at least one of the teeth receiving cavities decreased by a specified amount relative to a corresponding width of the patient's tooth at the distal end, and
   is progressively closer in width to the corresponding width of the patient's tooth when approaching the proximal end, reaching the same width as the corresponding width of the patient's tooth at the proximal end.

2. The orthodontic positioning appliance of claim 1, wherein a plurality of the teeth receiving cavities are shaped to compensate for non-elastic deformation due to use of the orthodontic positioning appliance.

3. The orthodontic positioning appliance of claim 1, wherein the at least one of the teeth receiving cavities is a molar tooth receiving cavity.

4. The orthodontic positioning appliance of claim 1, wherein a cavity of the at least one of the teeth receiving cavities is a bicuspid tooth receiving cavity.

5. The orthodontic positioning appliance of claim 1, wherein the teeth receiving cavities are shaped to apply the resilient positioning force to resiliently reposition teeth from a first arrangement to a subsequent arrangement.

6. The orthodontic positioning appliance of claim 5, wherein the lower portion is shaped to receive and resiliently reposition a tooth from a first position towards a second position.

7. The orthodontic positioning appliance of claim 5, wherein a geometry of the lower portion of the at least one of the teeth receiving cavities is selected to apply a desired force or torque to a tooth when worn by the patient.

8. The orthodontic positioning appliance of claim 1, wherein use of the orthodontic positioning appliance comprises positioning the orthodontic positioning appliance on the patient's teeth and removing the orthodontic positioning appliance from the patient's teeth.

9. A method for fabricating an orthodontic positioning appliance having teeth receiving cavities, the method comprising:
   receiving a representation of a patient's teeth in a selected arrangement;
   fabricating the orthodontic positioning appliance based on the received representation, the orthodontic positioning appliance including a shell of polymeric sheet material comprising one or more teeth receiving cavities having a first cavity portion shaped to compensate for non-elastic deformation due to use of the orthodontic positioning appliance, the first cavity portion comprising:
(i) an upper portion, and
(ii) a lower portion having a proximal end beginning at the upper portion and a distal end terminating near the patient's gingival margin when the orthodontic positioning appliance is worn by the patient, the lower portion of the shell of polymeric sheet material being shaped to compensate for non-elastic deformation due to a corresponding one or more of the patient's teeth being significantly wider away from the patient's gingival margin than near the patient's gingival margin, by being shaped with a width decreased by a specified amount relative to a corresponding width of the corresponding one or more of the patient's teeth at the distal end and is progressively closer in width to the corresponding width of the corresponding one or more of the patient's teeth when approaching the proximal end, reaching the same width as the corresponding width of the corresponding one or more of the patient's teeth at the proximal end, and wherein the upper portion is shaped to match a contour of an occlusal surface of the corresponding one or more of the patient's teeth.

10. The method of claim 9, wherein the fabricating of the shell of polymeric sheet material comprises creating a modified representation based on the received representation, the modified representation having at least one tooth with an exterior surface portion that is inwardly offset from a corresponding exterior surface in the received representation, and fabricating the orthodontic positioning appliance using the modified representation.

11. The method of claim 10, wherein fabricating the orthodontic positioning appliance comprises forming the sheet of polymeric sheet material over a positive model based on the modified representation.

12. An orthodontic positioning appliance comprising:
a patient removable orthodontic tooth positioning appliance including a shell of polymeric sheet material having teeth receiving cavities shaped to receive and apply a resilient positioning force to the patient's teeth, at least one of the cavities further includes:
(i) an upper portion; and
(ii) a lower portion comprising a proximal end beginning at the upper portion and a distal end terminating near the patient's gingival margin when the orthodontic positioning appliance is worn by the patient and, when the orthodontic positioning appliance is removed from the patient's teeth, the lower portion of the shell of polymeric sheet material is:
shaped to compensate for non-elastic deformation due to a first of the patient's teeth being significantly wider away from the gingival margin than near the gingival margin, by being produced to include a cavity decreased by a specified amount relative to a corresponding width of the first of the patient's teeth at the distal end, and
is progressively closer in width to the corresponding width of the first of the patient's teeth when approaching the proximal end, reaching the same width as the corresponding width of the first of the patient's teeth at the proximal end, and the upper portion is shaped to contact an occlusal surface of a crown of the first of the patient's teeth when the orthodontic positioning appliance is worn by the patient.

* * * * *